United States Patent Office 3,497,309
Patented Feb. 24, 1970

3,497,309
NEW DYEING PROCESS
Irwin Seltzer, Manchester, England, assignor to Imperial Chemical Industries Limited, Millbank, London, England, a corporation of Great Britain
No Drawing. Filed June 22, 1966, Ser. No. 559,427
Claims priority, application Great Britain, Aug. 16, 1965, 34,922/65
Int. Cl. D06p 3/60
U.S. Cl. 8—54.2                                3 Claims

ABSTRACT OF THE DISCLOSURE

A process of dyeing cellulose textile materials to avoid unlevel dyeing results which includes immersing the material in a dyebath of a solution of a reactive dyestuff and adding to the dyebath an acidic substance to provide a pH of 5.0 to 6.5 therein. The material is immersed in the dyebath for about 30 minutes. Thereafter an acid-binding agent is added to the dyebath to fix the dyestuff onto the cellulose textile material.

---

This invention relates to a new colouration process. More particularly, the invention relates to a new and improved process for the colouration by "reactive" dyestuffs of cellulose textile materials.

By a "reactive dyestuff" we mean a dyestuff containing a reactive halogen atom or other reactive atom or group, that is to say a halogen atom or other group capable of reacting with the fibre. Usually, reactive dyestuffs are water-soluble. They are principally used for vegetable fibres and regenerated cellulose, also using an alkali treatment to cause reaction therewith, and preferably have a small affinity for these materials when applied under conditions other than those giving rise to reaction with the material, so that unreacted dyestuff may readily be washed from the material after the colouration process. Examples of classes of such reactive dyestuffs include dyestuffs containing a s-triazinyl radical carrying one or two chlorine or bromine atoms directly attached to the triazine ring, dyestuffs containing a pyrimidyl radical carrying two or three chlorine or bromine atoms directly attached to the pyrimidine ring, dyestuffs containing a quinazoline, pyridazone or phthalazine nucleus containing 2 chlorine or bromine atoms on the heterocyclic nucleus, and dyestuffs containing a beta-halogenopropionyl, beta-halogenoethylsulphonyl, beta-halogenoethylsulphamyl, beta-sulphatoethylsulphonyl, beta-hydroxyethylsulphonyl, chloroacetylamino, γ-chloro-β-hydroxypropoxy, γ-chloro-β-hydroxypropylamino, γ-chloro-β-hydroxypropylsulphonyl, beta-(chloromethyl), beta-sulphatoethylsulphamyl, alkyl phosphite, or sulphon fluoride radical. The dyestuffs in these classes may be, for example nitro dyestuffs or dyestuffs of the azo, anthraquinone or phthalocyanine series and may be metal free or may contain metal in complex formation.

A known convenient method for application of such dyes is to immerse the material to be dyed in a neutral solution of the dyestuff also containing salt, for a period of time to allow the material to absorb a portion of the dyestuff, then to add an acid-binding agent to the dyestuff solution and allow the dyeing process to continue for a further period of time during which the dyestuff already absorbed by the material is fixed and further amounts of the dyestuff become absorbed and fixed. Whilst satisfactory for large numbers of commercially-available reactive dyestuffs, it is found that some dyestuffs are available for which this method gives unlevel results especially when applied at temperatures of 50° C. or above. It seems likely that these dyestuffs do not level satisfactorily before adding the acid-binding agent. This effect is more readily observed in closely-woven fabrics or tight yarns.

It has now been found that this disadvantage can be overcome by carrying out the initial step of the above at a pH of from 5.0 to 6.5.

According to the present invention, therefore, there is provided an improvement in the process of dyeing cellulose textile materials by immersing the material in a solution of reactive dyestuff for a period of time and thereafter adding acid-binding agent to the dyebath, for such dyes as give unlevel results using a neutral solution of dyestuff for the first stage of the dyeing process, which consists in carrying out said first stage of the dyeing process in a dyebath having a pH of from 5.0 to 6.5.

The preferred pH is 5.5.

The dyestuff solution can contain the usual additives, which normally are sodium chloride or sodium sulphate to assist adsorption of the dyestuff, and sequestering agent in the case of hard water. For adjustment of the pH to the desired figure, an acid must also be added, and this should be a mildly acid substance in order to readily achieve the limited amount of acidity desired. Examples of suitable acid substances are acetic acid, ammonium sulphate and ammonium dihydrogen phosphate, but the preferred acidic substance is sodium dihydrogen phosphate.

After the initial absorption of dyestuff, the dyeing process is carried out by the prior are method, the only point to note being that additional acid-binding agent may be necessary to neutralise the acid present in the dyebath.

The invention is illustrated but not limited by the following examples in which parts and percentages are by weight:

EXAMPLE 1

100 parts of a two-fold, mercerised bleached cotton yarn are immersed in a solution of 2 parts of the tetrasodium salt of the copper complex of 2-(4':6'-dichloro-1':3':5' - triazin - 2' - ylamino) - 6 - {2" - hydroxy - 5"-methyl - 4" - [2'":4'" - disulphophenylazo]phenylazo}-5-naphthol-1:7-disulphonic acid and 2 parts of sodium dihydrogen phosphate crystals in 2000 parts of water at 60° C. 80 parts of sodium chloride are then added and dyeing is carried out for 30 minutes at 60° C. 5 parts of sodium bicarbonate and 5 parts of sodium carbonate are added, and dyeing continued for a further 40 minutes at 60° C. The dyed material is then removed from the dyebath, rinsed in water, treated for 15 minutes in a 0.3% aqueous solution of a synthetic detergent at 100° C., rinsed again in water, and finally dried. The cotton yarn is thereby uniformly dyed a dark blue shade.

EXAMPLE 2

In place of the 2 parts of the dyestuff used in Example 1 there are used 2 parts of the trisodium salt of 1-(4',6'-dichloro-1',3',5'-triazin - 2' - ylamino) - 7 - (1" - sulphonaphth - 2" - ylazo) - 8 - naphthol - 4,6 - disulphonic acid or 2 parts of the trisodium salt of the copper complex of 2-[3'-sulpho-4'-(4",6" - dichloro - 1",3",5" - triazin - 2" - ylamino)anilino] - 7 - [2'" - hydroxy - 5'"-methyl - 4'" - (o - sulphophenylazo)phenylazo] - 8 - naphthol-6-sulphonic acid whereby the cotton yarn is uniformly dyed in red and grey shades respectively.

EXAMPLE 3

100 parts of a mercerised, bleached cotton poplin are immersed in a solution of 2 parts of the tetrasodium salt of the copper complex of 2 - (4',6' - dichloro - 1',3',5'-triazin - 2' - ylamino) - 6 - {2" - hydroxy - 5" - methyl-4"-[2'",4'"-disulphophenylazo]phenylazo} - 5 - naphthol-1,7-disulphonic acid and 2 parts of sodium dihydrogen phosphate crystals in 500 parts of water at 60° C. 20 parts of sodium chloride are then added and dyeing is carried out for 30 minutes at 60° C. 2.5 parts of sodium bicarbonate and 2.5 parts of sodium carbonate are added, and dyeing continued for a further 40 minutes at 60° C. The dyed material is then removed from the dyebath, rinsed in water, treated for 15 minutes in a 0.3% aqueous solution of a synthetic detergent at 100° C., rinsed again in water and finally dried. The cotton poplin is thereby uniformly dyed a dark blue shade.

EXAMPLE 4

In place of the 2 parts of the dyestuff used in Example 3 there are used 2 parts of the trisodium salt of 1-(4',6'-dichloro-1',3',5' - triazin - 2' - ylamino) - 7 - (1'' - sulphonaphth - 2'' - ylazo) - 8 - naphthol - 4,6 - disulphonic acid or 2 parts of the trisodium salt of the copper complex of 2 - [3' - sulpho - 4' - (4'',6'' - dichloro - 1'',3'',5'' - triazin-2'' - ylamino)anilino] - 7 - [2''' - hydroxy - 5''' - methyl-4''' - (o - sulphophenylazo)phenylazo] - 8 - naphthol - 6-sulphonic acid whereby the cotton poplin is uniformly dyed in red and grey shades respectively.

EXAMPLE 5

100 parts of a two-fold, mercerised bleached cotton yarn are immersed in a solution of 2 parts of copper phthalocyanine 3 - (sulphonamide)$_{1.3}$ - 3 - (N - α - methyl - β-chloroethylsulphonamide)$_{1.5}$ - 3 - (sulphonic acid)$_{1.2}$ and 2 parts of sodium dihydrogen phosphate crystals in 2000 parts of water at 95° C. 80 parts of sodium chloride are then added, and dyeing is carried out for 30 minutes at 95° C. 40 parts of sodium carbonate are added and dyeing continued for a further 40 minutes at 60° C. The dyed material is then removed from the dyebath, rinsed in water, treated for 15 minutes in a 0.3% aqueous solution of a synthetic detergent at 100° C. rinsed again in water and finally dried. The cotton yarn is thereby uniformly dyed a turquoise blue shade.

What I claim is:

1. A process for dyeing a cellulose textile material which comprises immersing said material in a dyebath comprising an aqueous solution of a reactive dyestuff containing a group selected from the class consisting of dichloro - 1,3,5 - triazin - 2 - ylamino and β - chloroethylsulphamoyl groups, adding to said dyebath an acidic substance in amounts sufficient to provide a pH of 5.0 to 6.5 in said dyebath, continuing the immersion of said material in said dyebath for a period of about 30 minutes and thereafter adding an acid-binding agent to said dyebath to fix said dyestuff onto said cellulose textile material.

2. The process of claim 1 wherein the acidic substance is added in amounts sufficient to provide a pH of 5.5 in said dyebath.

3. The process of claim 1 wherein the acidic substance added to said dyebath is sodium dihydrogen phosphate.

References Cited

UNITED STATES PATENTS

| | | | |
|---|---|---|---|
| 2,892,670 | 6/1959 | Alsberg et al. | |
| 3,132,918 | 5/1964 | Corpening | 8—54.2 |
| 3,183,053 | 5/1965 | Randall et al. | 8—54.2 |

GEORGE F. LESMES, Primary Examiner

T. J. HERBERT, JR., Assistant Examiner